April 29, 1941.  O. V. SCALPH ET AL  2,239,862
ELECTRIC TOASTER
Filed March 21, 1939
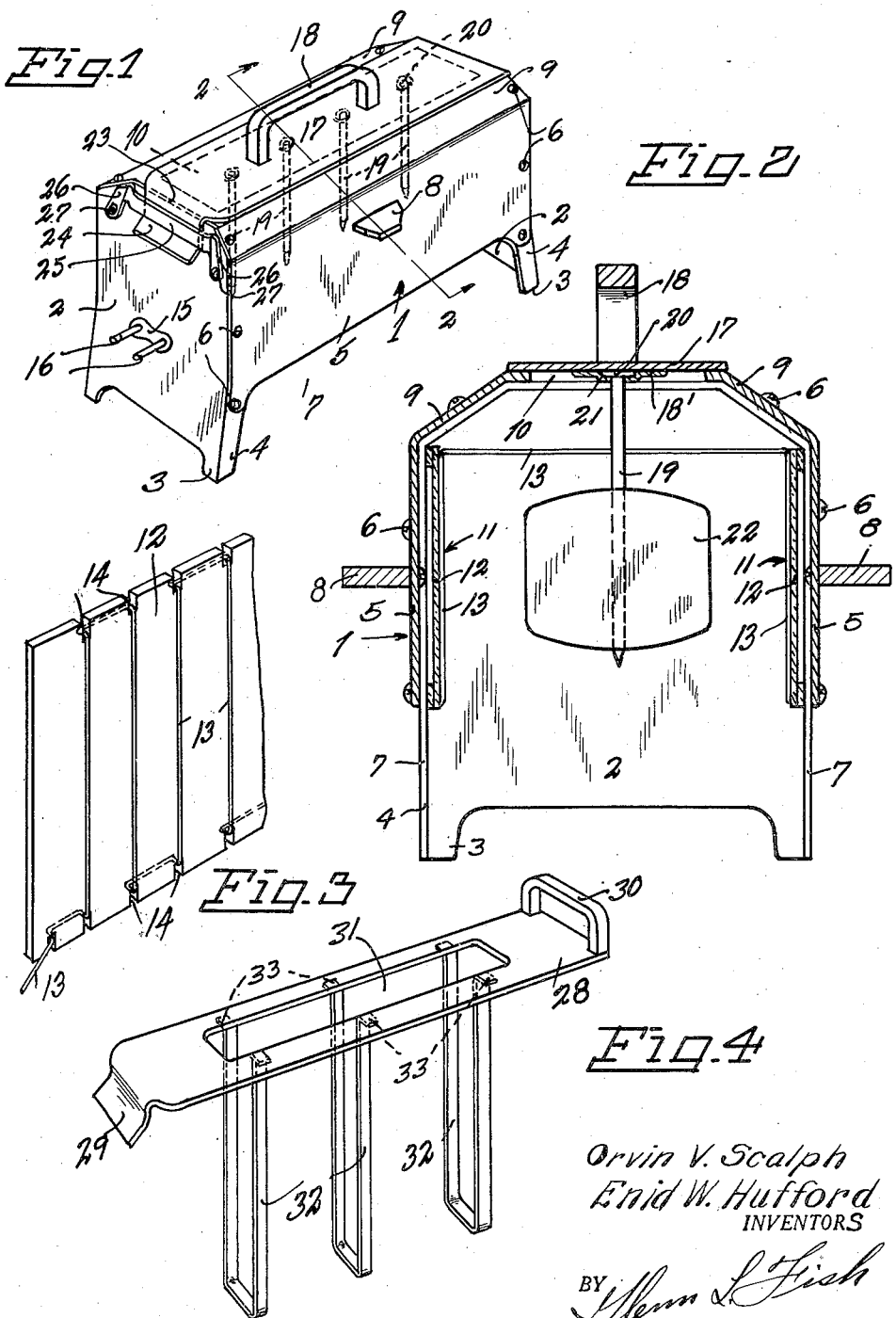
Orvin V. Scalph
Enid W. Hufford
INVENTORS
BY Glenn L. Fish
ATTORNEYS.

Patented Apr. 29, 1941

2,239,862

UNITED STATES PATENT OFFICE 2,239,862

ELECTRIC TOASTER

Orvin V. Scalph and Enid W. Hufford, Spokane, Wash.

Application March 21, 1939, Serial No. 263,106

2 Claims. (Cl. 53—5)

This invention relates to electric toasters and more particularly to a toaster by means of which marshmallows may be toasted, it being one object of the invention to provide a toaster of such construction that marshmallows may be suspended therein between heating units and above a dish over which the body of the toaster is disposed when resting on a table, the marshmallows, when toasted, dropping into the dish.

Another object of the invention is to provide a toaster having a body open at its top and bottom, the open top of the body being normally closed by a cover carrying depending pins upon which marshmallows are applied by passing the pins through them. It will thus be seen that the marshmallows will be supported in the toaster by the pins and when the marshmallows are toasted they may slide downwardly along the pins and drop into a dish over which the toaster is disposed.

Another object of the invention is to provide a toaster wherein heating units are mounted within the body against side walls thereof, the upper portion of the body being so formed that heat rising from the heating units will be deflected toward the central portion of the body and cause marshmallows to be quickly and evenly toasted.

Another object of the invention is to provide the body with a cover adapted to be easily applied to the body in closing relation to the open top thereof, one end of the cover having a securing tongue for engaging with a keeper carried by an end wall of the body and holding the cover in place.

Another object of the invention is to provide an attachment which may be substituted for the cover, carrying depending pins and permit bread to be toasted instead of marshmallows.

The invention is illustrated in the accompanying drawing, wherein:

Fig. 1 is a perspective view of the improved toaster.

Fig. 2 is a vertical sectional view taken transversely through the toaster on the line 2—2 of Fig. 1.

Fig. 3 is a perspective view of one of the heating units.

Fig. 4 is a perspective view of an attachment for holding bread.

This improved toaster is primarily intended for toasting marshmallows but its use is not restricted to this purpose. The body 1 of the toaster is formed of metal and has end walls 2 formed with supporting feet 3 and side flanges 4, to which ends of the side walls 5 are secured by screws 6. The lower edges of the side walls are spaced upwardly from lower ends of the end walls, thus providing spaces 7 under the side walls through which a dish may be passed into or out of place under the toaster. It will, of course, be understood that the toaster may be lifted by the handles 8 projecting from the side walls and set in place over a dish upon a table instead of sliding the dish into place after the toaster has been set upon the table. Upper portions of the end walls are reduced in width, as shown in Fig. 2, and the inwardly bent upper portions 9 of the side walls, which are secured to the reduced upper portions of the end walls, serve as deflectors for directing heat waves toward the central portion of the body. The inwardly deflected upper ends of the side walls terminate in spaced relation to each other to provide an opening 10 at the top of the toaster constituting an inlet through which the marshmallows are passed inwardly into the toaster. Heating units 11 are mounted in the body against side walls thereof and each consists of an asbestos board 12 carrying a resistance coil 13. This coil extends back and forth across the board 12 with portions engaged in notches 14 formed in upper and lower edges of the board. In order that current may be supplied to the heating coils, there has been provided a terminal 15 including the usual pins 16 for engagement by a conventional terminal plug of a conductor wire.

The open upper end of the body 1 is normally closed by a cover or lid 17 formed of metal and provided with a handle 18, by means of which it may be lifted when it is removed or applied to the body. A plate 18' is secured against the under face of the cover and formed with a number of openings through which are passed pins 19 having heads 20 at their upper ends, portions of the plate 17 about the pin receiving openings, being offset downwardly to form pockets 21 for receiving the heads of the pins. It will thus be seen that the pins will be firmly held in place with their heads countersunk and in flat contacting engagement with the cover. These pins extend downwardly from the cover into the body when the cover is in place and serve as means for supporting marshmallows 22 midway the width of the body in spaced relation to the heating units 11. The pins are straight and formed with pointed lower ends so that they may be easily passed through marshmallows and are of such length that the marshmallows, when impaled upon the pins, may be disposed either close to lower ends of the pins, as shown in Fig. 2, or in higher positions.

After the marshmallows are impaled upon the pins, the cover is applied to the top of the body in closing relation to the opening 10 and held in place by the tongue 23 which extends downwardly from one end of the cover. This tongue has its lower end portion bent outwardly to form a lip 24 which projects outwardly from the strap or keeper 25 through which the tongue passes, and since the tongue can only be passed through the strap by tilting the cover vertically, the cover cannot accidentally slip out of its proper operative position upon the body. Depending arms or attaching feet 26 are formed at ends of the strap and secured to the end wall of the body by rivets 27.

During use of the toaster, the cover is removed after the toaster has been set in place over a dish and a conductor cord applied to the pins 16 of the terminal 15. The marshmallows are then applied to the pins and the cover replaced. The marshmallows will thus be suspended in the toaster midway of the heating units and since the marshmallows are somewhat sticky, they will remain in the positions in which they are applied to the pins. As the marshmallows are toasted, the heat of the units 11 not only will cause the outer surfaces of the marshmallows to become crisp but also soften their interiors to such an extent that they will gradually slide downwardly along the pins and finally drop therefrom into the dish. It will thus be seen that by properly placing the marshmallows upon the pins, the length of time the marshmallows will be subjected to the heat of the units 11 may be controlled and slightly toasted or very crisply toasted marshmallows produced. Therefore, it is not necessary to remove the cover until the marshmallows have all dropped from the pins and additional marshmallows are to be applied.

If it is desired to toast bread instead of marshmallows, the attachment illustrated in Fig. 4 is applied in lieu of the cover 17. This attachment consists of a plate or cover 28 of the same dimensions as the cover 17 and having one end formed with a depending tongue 29 corresponding to the tongue 23, and its other end formed with a handle 30 taking the place of the handle 18. An opening 31 of dimensions to receive a slice of bread is formed in the plate 28 and, in order to support the slice of bread, there have been provided metal yokes 32 which are of U-shape and have the upper ends of the arms thereof bent to form attaching feet 33 welded or otherwise secured to the under face of the plate 28 at opposite sides of the slot 31. When this attachment is in use, it is applied in lieu of the cover 17 and a slice of bread passed inwardly through the opening 31 where it will be supported by the yokes 32 in position between the heating units 11 and both sides of the bread toasted. After the slice of bread has been toasted it can be withdrawn through the opening or, if it is found that it does not protrude from the opening 31 far enough to be grasped, the plate 28 may be lifted from one end by its handle 30 and the slice of toast removed, the plate being then again lowered into place on top of the body and another slice of bread passed inwardly through the opening into engagement with the yokes.

Having thus described the invention, what is claimed is:

1. In a toaster, a hollow body open at its top and having a flat wall at one end, a strap extending transversely across the upper end portion of said end wall in spaced relation to the outer face thereof with its end portions secured to the end wall, a removable cover for said body consisting of a metal plate of dimensions adapting it to rest on the body in covering relation to the open top thereof with one end of the cover plate projecting from the body, the projecting end portion of the cover plate being bent downwardly to form a depending tongue bearing against the flat end wall of the body and passing through space between the wall and the strap and having its lower portion bent to form an outwardly deflected downwardly inclined lip engaging under the strap to releasably hold the cover plate in place upon the body, and means depending from the cover plate for supporting articles to be toasted within the body.

2. A cover for a toaster comprising a plate of dimensions adapting it to rest on a toaster body in covering relation to an opening therein, one end portion of said plate being bent downwardly to form a securing tongue, the plate having its intermediate portion formed with an opening extending longitudinally of the plate for the major portion of the length thereof, and U-shaped yokes depending from said plate in straddling relation to the opening and having out turned feet at upper ends of its arms secured to the under face of the plate at opposite sides of the opening to rigidly mount the yokes under the plate in spaced relation to each other longitudinally thereof in position to receive material thrust inwardly through the opening in the plate and support the material in an upright position for removal through the opening.

ORVIN V. SCALPH.
ENID W. HUFFORD.